United States Patent [19]

Kasai

[11] Patent Number: 4,616,729
[45] Date of Patent: Oct. 14, 1986

[54] TRANSMISSION CHAIN ADJUSTER FOR MOTORCYCLES

[75] Inventor: Yasuhiro Kasai, Iwata, Japan

[73] Assignee: Yamaha Hatsudoki Kabushiki Kaisha, Iwata, Japan

[21] Appl. No.: 708,708

[22] Filed: Mar. 6, 1985

[30] Foreign Application Priority Data

Mar. 7, 1984 [JP] Japan .................. 59-44395

[51] Int. Cl.⁴ .................................................. B62K 25/02
[52] U.S. Cl. .................. 180/231; 180/219; 280/281 W; 280/284
[58] Field of Search ............ 280/281 W, 284; 180/231, 215, 219, 227; 474/88

[56] References Cited

U.S. PATENT DOCUMENTS 1,143,793  6/1915  Strand ........................... 180/231
4,433,747  2/1984  Offenstadt ..................... 180/227

FOREIGN PATENT DOCUMENTS 54-35470  10/1979  Japan .

Primary Examiner—John J. Love
Assistant Examiner—Donn McGiehan
Attorney, Agent, or Firm—Ernest A. Beutler

[57] ABSTRACT

An off the road motorcycle having a balloon tired rear wheel that is suspended by a trailing arm and which is driven by a pair of flexible transmitters, one positioned closer to the motorcycle center line than the other so as to provide clearance for the rider's feet. An arrangement is provided for adjusting the tension in each of the two chains and one of these adjusting mechanisms moves the pivot point of the trailing arm relative to the frame.

14 Claims, 7 Drawing Figures

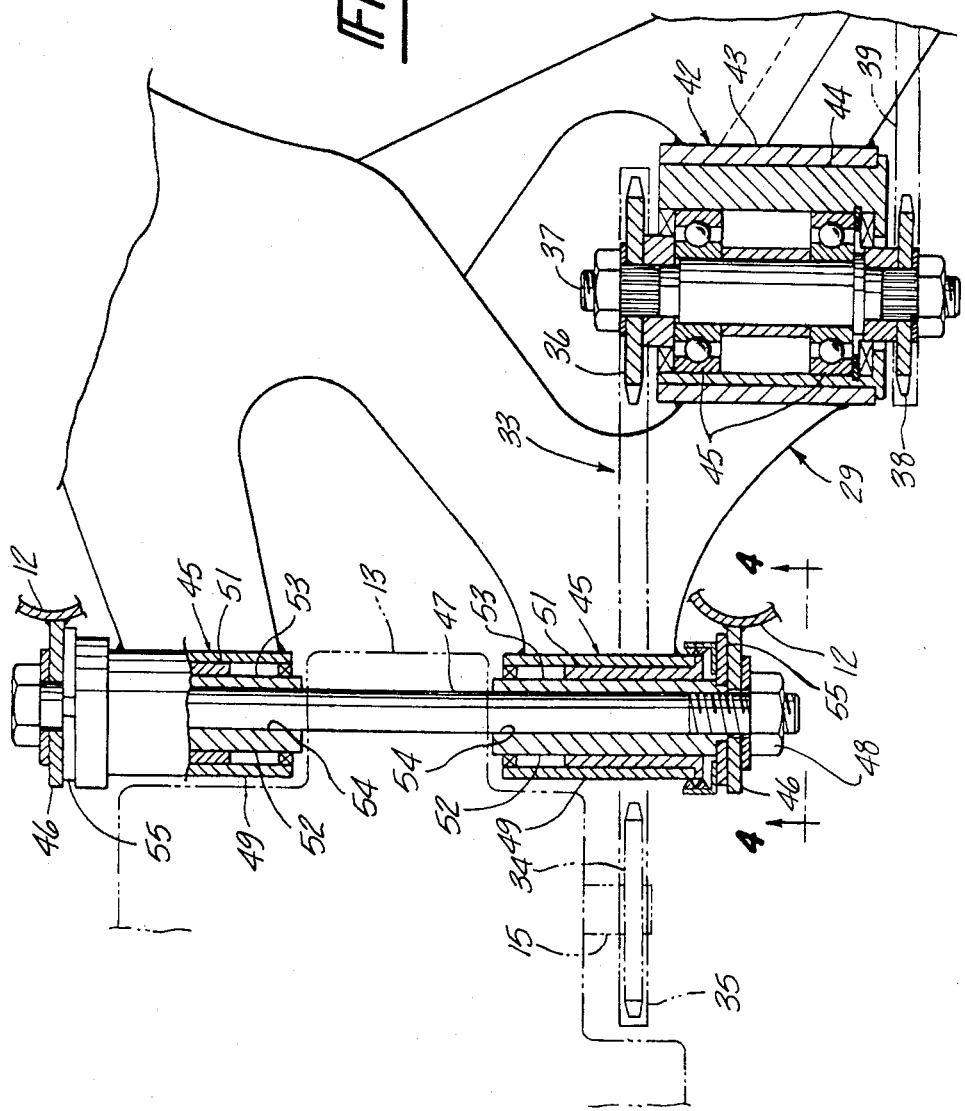

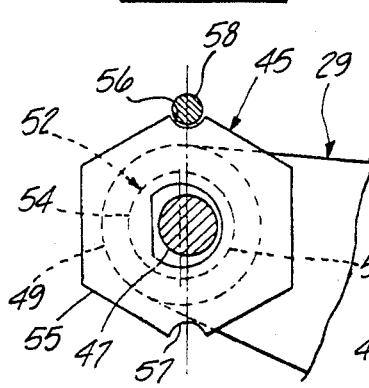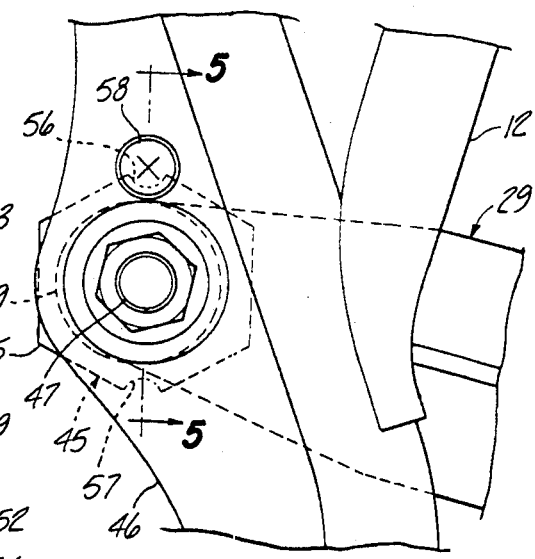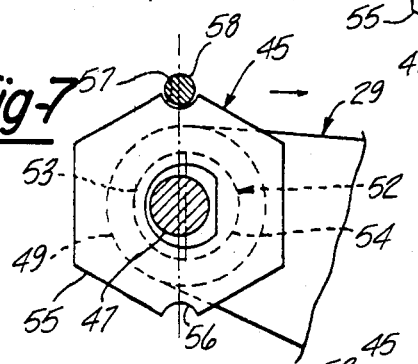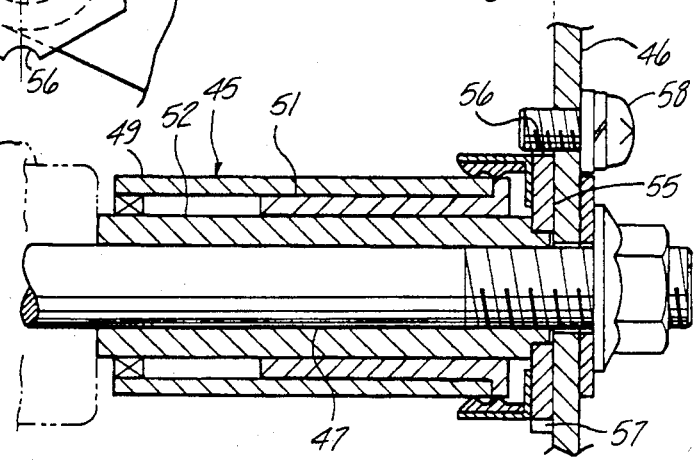

TRANSMISSION CHAIN ADJUSTER FOR MOTORCYCLES

BACKGROUND OF THE INVENTION

This invention relates to a transmission chain adjuster for motorcycles and more particularly to an improved, simplified and compact chain adjusting mechanism for the drive of a wheeled vehicle.

In many types of wheeled vehicles, such as motorcycles, chain transmisions are still very popular and practical as a manner for driving the wheels. Even though the driven wheel may be supported for suspension travel such as by a trailing arm arrangement, there are numerous advantages to the use of a chain drive transmission. Recently, however, it has been proposed to provide a very wide, low pressure rear wheel for motorcycles that will facilitate off the road use. In addition, the wheel is also supported for suspension movement by a trailing arm construction. With this type of device, it is practical to use a pair of driving chains for driving the rear wheel. The first chain extends from the engine output shaft to an idler shaft and is disposed close to the longitudinal center line of the vehicle. The second chain is driven by the idler shaft and, in turn, drives the rear wheel and is positioned laterally outwardly a sufficient distance so as to permit such drive for the rear wheel. The advantage of such two chain constructions is that the first chain can be positioned close to the center line and in a location where it will not interfere with the rider's legs. An example of such an arrangement is shown in Japanese Utility Model Publication No. 54-35470.

With the use of such a dual chain arrangement, however, there are certain difficulties in connection with the chain placement and its adjustment. For example, in the aforenoted Japanese utility model publication, the axis of rotation of the idler shaft is disposed coincident with the pivotal axis of the trailing arm. This gives rise to the use of a very short primary driving chain and substantially increases the stresses on the chain. In addition, it is necessary or desirable to provide some arrangement for permitting adjustment of the chain tension and the placement of the type shown in that utility model application makes it very difficult to obtain sufficient width for adjusting of the chains.

It is, therefore, a principal object of this invention to provide an improved transmission mechanism for motorcycles.

It is another object of this invention to provide an improved motorcycle transmission mechanism wherein the tensioning of the drive chains can be easily facilitated.

It is a yet further object of this invention to provide an improved and compact, yet easily adjusted, chain drive transmission mechanism for motorcycles.

SUMMARY OF THE INVENTION

This invention is adapted to be embodied in a chain drive for wheeled vehicles that comprises frame means, power means carried by the frame means for driving a drive shaft rotatable about a first axis extending transversely to the longitudinal axis of the frame means, trailing arm means supported for pivotal movement about a pivot axis by the frame means, an idler shaft rotatably journaled on the trailing arm means about a second axis pivotal to the first axis and the pivot axis and spaced therefrom, and first flexible transmitter means for driving the idler shaft from the drive shaft. A wheel is journaled by the trailing arm means for rotation about a third axis spaced from the first, second and pivot axes. A second flexible transmitter is provided for driving the wheel from the idler shaft and means are provided for adjusting the distance between the second axis and the first axis for adjusting the tension of the first flexible transmitter means.

BRIEF DESCRIPTION OF THE DRAWINGS

FIG. 3 is a cross-sectional view taken on an enlarged scale and generally along the line 3—3 of FIG. 1.

FIG. 4 is a further enlarged view looking generally in the direction of the arrows 4—4 in FIG. 3.

FIG. 5 is a cross-sectional view taken along the line 5—5 of FIG. 4.

FIG. 6 is a cross-sectional view taken along the line 6—6 of FIG. 5 and shows the adjusting mechanism in a first position.

FIG. 7 is a cross-sectional view, in part similar to FIG. 6, showing the adjusting mechanism in a second position.

DETAILED DESCRIPTION OF THE PREFERRED EMBODIMENT

Figure 1:
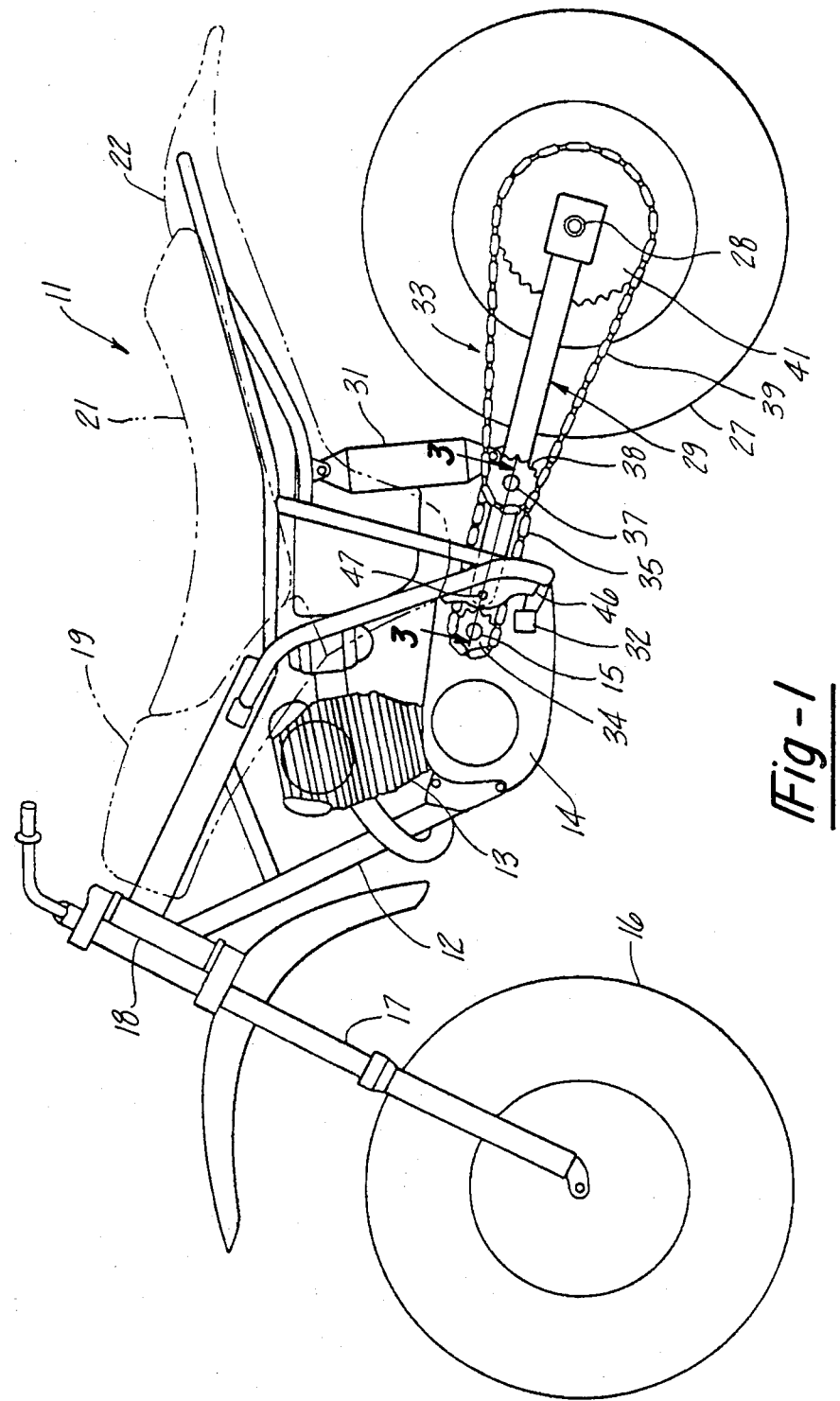
FIG. 1 is a side elevational view of a motorcycle having a chain drive mechanism constructed in accordance with an embodiment of the invention, with portions shown in phantom.

In the drawings, the reference numeral 11 indicates generally an off the road motorcycle constructed in accordance with an embodiment of the invention. Although the invention is described in conjunction with such a motorcycle, it is to be understood that certain facets of the invention may be used with other types of motorcycles and, in fact, may be used with other types of wheeled vehicles.

The motorcycle 11 includes a frame assembly, indicated generally by the reference numeral 12, and which may be of any known type. In the illustrated embodiment, the frame assembly 12 is depicted as being made up from a welded tubular assembly. An engine 13 is supported by the frame assembly 12 and, in the illustrated embodiment, includes a combined crankcase transmission assembly 14 that drives an output shaft 15.

A balloon tired fron wheel 16 is supported at the lower end of a front fork assembly 17, which front fork assembly is dirigibly supported by the frame assembly 12 in a known manner, as by means incluing a head tube 18.

A fuel tank, shown in phantom and indicated by the reference numeral 19, is supported on the frame assembly 12 to the rear of the head tube 19. A seat assembly 21, also shown in phantom, is positioned on the frame assembly 12 to the rear of the fuel tank 19. A body consisting of a fender 22 underlies the rear portion of the seat 21 and extends rearwardly.

Figure 2:
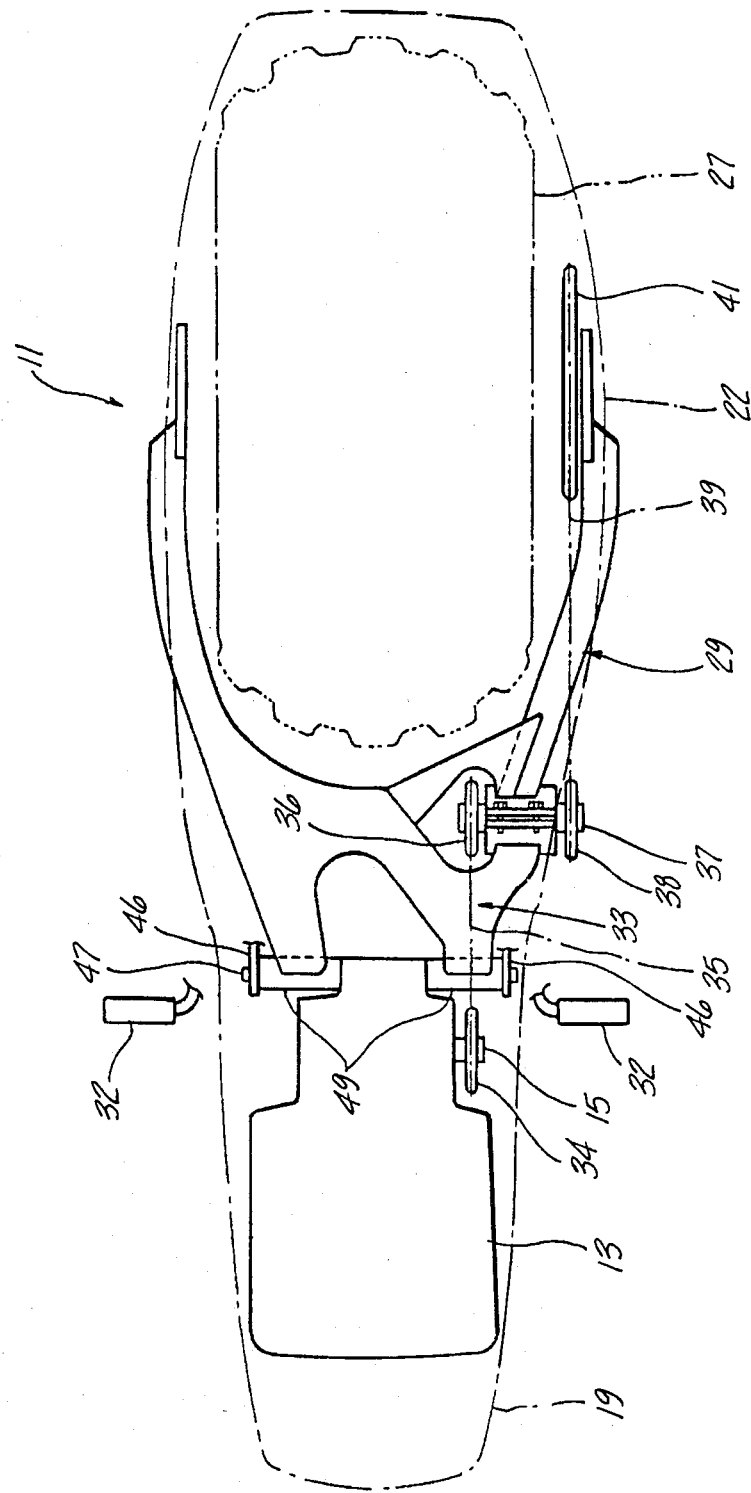
FIG. 2 is an enlarged top plan view of the rear portion of the motorcycle, with further portions shown in phantom.

A low pressure, ballon tired rear wheel 27 is journaled for rotation about an axis defined by a axle 28 at the rear end of a trailing arm assembly, indicated generally by the reference numeral 29. The trailing arm assembly 29 may be of any suitable configuration but is of the bifurcated type due to the width of the rear wheel 27. As may be readily seen from FIG. 2, the rear wheel 27 is substantially wider than the front wheel so as to adapt the motorcycle 11 particularly for off the road use.

The trailing arm 29 is supported for pivotal movement relative to the frame 12 in a manner to be described. This pivotal movement is cushioned by means of a combined shock absorber spring assembly 31 that is centrally positioned on the longitudinal center plane of the frame 12 and which is loaded between the frame 12 and the trailing arm 29 so as to cushion the ride.

A pair of foot pegs 32 are disposed on opposite sides of the frame 12 so as to accommodate the feet of the rider.

A chain drive transmission, indicated generally by the reference numeral 33 is provided for transferring drive the engine output shaft 15 to the rear wheel 27. The transmission 33 includes a first or driving sprocket 34 that is affixed to the output shaft 15 at one side of the engine transmission assembly 14 and spaced inwardly of the motorcycle 11 toward the longitudinal center line of the frame assembly 12. A first driving chain 35 encircles the sprocket 34 and a idler sprocket 36 that is affixed to an idler shaft assembly 37 carried by the trailing arm assembly 29 rearwardly of its pivot axis, in a manner to be described.

A second idler sprocket 38 is affixed to the idler shaft 37 at a distance spaced outwardly from the idler sprocket 36 sufficiently so that a drive chain 39 encircling this sprocket and a driven sprocket 41 affixed for rotation with the rear wheel 27 will clear the rear wheel 27. As a result of using this double chain arrangement, it is possible to provide a transmission wherein the forwardmost chain 35 is spaced inwardly clear of the foot pegs 32 and of a rider's feet so that there will be no interference. However, the rearwardly placed second driving chain 39 may be spaced outwardly a sufficiently distance so that it will clear the wide rear tire 27 and at the same time not interfere with the rider. This is possible since the idler shaft 37 is positioned rearwardly on the trailing arm assembly 29 from the rider's normal leg position.

The mounting arrangement for the idler shaft 37 on the trailing arm assembly 29 will now be described by primary reference to FIG. 3. This mounting is such that the tension of the chains 33 and 39 but primarily of the chain 39 may also be set by this mechanism. The supporting mechanism is indicated generally by the reference numeral 42 and includes a split bushing 43 that is affixed to the trailing arm assembly 29. The split bushing 43 contains an eccentric sleeve 44 that supports, in an eccentric manner, a pair of anti-friction bearings 45. The bearings 45 define an axis of rotation for the idler shaft 37 and rotatably support it. This axis is offset from the axis of the split sleeve 43 in which the bushing 44 is rotatably positioned. A suitable clamping mechanism, for example that of the type shown in the copending United States Application filed in the name of Katsuya Ishino, claiming priority on Japanese Application Sho 59-50506, may be employed for this purpose.

FIG. 3 shows the construction wherein the distance between the idler sprocket 38 and the driven sprocket 41 is at its maximum and the distance between the idler sprocket 36 and the driving sprocket 35 is at its minimum, as afforded by the support 42. Rotation of the bushing 44 through 180° will cause minimum tensioning of the chain 39 and maximum tensioning of the chain 35 since the distances between the sprockets 38 and 41 will then be at their minimum while that between the sprockets 35 and 36 will be at their maximum.

An arrangement is provided for permitting adjustment of the tension in the chain 35 independently of the adjustment in the chain 39. This mechanism is also best shown in FIG. 3, but is additionally shown in more detail in FIGS. 4 through 7 and will now be described in detail by primary reference to those figures.

The mechanism for adjusting the chain 35 is also effective to provide the pivotal support for the trailing arm assembly 29 and adjust the tension of the chain 35 by altering the pivot axis of the trailing arm assembly 29. The supporting and adjusting mechanism includes a pair of bearing assemblies, each indicated generally by the reference numeral 45 that are provided at the forward ends of the trailing arm assembly 29 and on opposite sides of the longitudinal center line of the frame assembly 12. As may be seen in FIG. 3, this portion of the trailing arm assembly straddles a rearwardly extending boss of the engine transmission assembly 13.

A pair of brackets 46 are affixed, as by welding, to the frame assembly 12 at the opposite sides thereof. A shaft 47 extends through these brackets 46 and the aforementioned boss on the engine transmission assembly. The shaft 47 may be formed by an elongated bolt that is axially held in position by means of a nut 48. The bolt or pivot shaft 47 extends through a pair of brackets 49 that are affixed, as by welding, to the forward ends of the trailing arm assembly 29. The brackets 49 have internal bores in which anti-friction bushings 51 are received. The bushings 51, in turn, rotatably journal eccentric sleeves 52. The sleeves 52 have cylindrical outer portions 53 that are engaged with the anti-friction bushings 51 so that they can be rotated, in a manner to be described. In addition, the bushings 52 are provided with an eccentrically disposed bore 54 that receives and supports the shaft 47.

The bushings 52 have hexagonal members 55 either integrally formed with them or formed as separate members that are keyed non-rotatably to the bushings 52. The hexagonal members 55 are juxtaposed to the brackets 46 and may be engaged by a wrench or suitable tool so that they can be rotated so as to change the orientation of the bushings 52 within the anti-friction bearings 51 and the distance between the sprockets 34 and 36 and, accordingly, the tension in the chain 35. Notches such as the notches 56 and 57 may be formed in the hexagonal members 55 so as to lock the hexagonal members against rotation. This locking is achieved by means of a threaded fastener such as a bolt 58 that is threaded into the brackets 46 and adapted to enter into a selected one of the notches 56 or 57 so as to non-rotatably affix the hexagonal members 55 and also their attached bushings 52.

FIG. 6 shows the adjusted position when the sprockets 34 and 36 are at their minimum spacing and there will be the minimum tension in the chain 35. At this time, the rotational axis of the anti-friction member 51 upon the bushing 52 will be spaced forwardly of a line passing through the notches 56 and 57. However, by removing the bolt 58 and appropriately rotating the hexagonal portions 55, the bushings 52 may be rotated to the position shown in FIG. 7 wherein the same center line of the pivotal movement of the bushing 51 will be disposed rearwardly so as to increase the tension on the chain 35. In this way, the tension on the chain 35 may be adjusted independently of the tension on the chain 39 to compensate for wear and/or chain stretch.

It should be readily apparent from the foregoing description that an improved and simplified transmission assembly is provided that employs a pair of chains and wherein the tensioning of the chains may be done independently of each other. This is done even though the intermediate shaft of the chain drive is supported on a pivotal member. The adjustment may be easily performed with a relatively uncomplicated mechanism.

Although an embodiment of the invention has been illustrated and described, it is believed to be obvious to those skilled in the art that various changes and modifications may be made without departing from the spirit and scope of the invention, as defined by the appended claims.

I claim:

1. A chain drive for a wheeled vehicle comprising frame means, power means carried by said frame means for driving a drive shaft rotatably about a first axis extending transversely to the longitudinal axis of said frame means, trailing arm means supported for pivotal movement about a pivot axis by said frame means, an idler shaft rotatably journaled on said trailing arm means about a second axis parallel to said first axis and said pivot axis and spaced therefrom, first flexible transmitter means driving said idler shaft from said drive shaft, a wheel journaled by said trailing arm means for rotation about a third axis spaced from said first, said second and said pivot axes, second flexible transmitter means for driving said wheel from said idler shaft and means for adjusting the distance between said second axis and said first axis for adjusting the tension of said first flexible transmitter means.

2. A chain drive for a wheeled vehicle as set forth in claim 1 wherein the means for adjusting the distance between the first and the second axis does not affect the distance between the second and third axes upon said adjustment.

3. A chain drive for a wheeled vehicle as set forth in claim 1 further including means for adjusting the tension of the second flexible transmitter means.

4. A chain drive for a wheeled vehicle as set forth in claim 1 wherein the fist flexible transmitter means is disposed closer to the longitudinal center line of the frame means that the second flexible transmitter means.

5. A chain drive for a wheeled vehicle as set forth in claim 4 wherein the wheeled vehicle comprises a motorcycle having a front wheel and a rear wheel, the rear wheel being mounted by the trailing arm means and having a substantially greater width than the frame means and the front wheel.

6. A chain drive for a wheeled vehicle as set forth in claim 5 wherein the means for adjusting the distance between the first and the second axis does not affect the distance between the second and third axes upon said adjustment.

7. A chain drive for a wheeled vehicle as set forth in claim 5 further including means for adjusting the tension of the second flexible transmitter means.

8. A chain drive for a wheeled vehicle as set forth in claim 1 wherein the means for adjusting the distance between the second axis and the first axis is operative to adjust the location of the pivot axis relative to the first axis.

9. A chain drive for a wheeled vehicle as set forth in claim 8 wherein the first flexible transmitter means is disposed closer to the longitudinal center line of the frame means than the second flexible transmitter means.

10. A chain drive for a wheeled vehicle as set forth in claim 9 wherein the wheeled vehicle comprises a motorcycle having a front wheel and a rear wheel, the rear wheel being mounted by the trailing arm means and having a substantially greater width than the frame means and the front wheel.

11. A chain drive for a wheeled vehicle as set forth in claim 10 wherein the means for adjusting the distance between the first and the second axis does not affect the distance between the second and third axes upon said adjustment.

12. A chain drive for a wheeled vehicle as set forth in claim 10 further including means for adjusting the tension of the second flexible transmitter means.

13. A chain drive for a wheeled vehicle as set forth in claim 8 wherein the trailing arm means comprises a pair of spaced apart arm portions supporting eccentric bushing means rotatable with respect thereto for adjusting the pivot axis.

14. A chain drive for a wheeled vehicle as set forth in claim 13 wherein the rotatable bushings cooperate with a fixed pivot pin carried by the frame means.

* * * * *